US006686013B1

(12) United States Patent
Tebbe

(10) Patent No.: US 6,686,013 B1
(45) Date of Patent: Feb. 3, 2004

(54) ARTICLE COMPRISING BOARD, PAPER OR THE LIKE AND PROCESS AND INTERMEDIATE PRODUCT FOR THE PRODUCTION THEREOF

(75) Inventor: Gerold Tebbe, Monte Carlo (MC)

(73) Assignee: Deotexis Inc., New York, NY (US)

( * ) Notice: Subject to any disclaimer, the term of this patent is extended or adjusted under 35 U.S.C. 154(b) by 348 days.

(21) Appl. No.: 09/632,688

(22) Filed: Aug. 7, 2000

(30) Foreign Application Priority Data

Aug. 10, 1999 (DE) ........................................ 199 36 794

(51) Int. Cl.[7] ................................................ B32B 9/00

(52) U.S. Cl. .......................... 428/40.1; 239/34; 284/59; 284/105; 284/428; 428/40.2; 428/41.7; 428/41.8; 428/42.1; 428/192; 428/194; 428/201; 428/537.5; 428/906

(58) Field of Search .............................. 428/40.1, 40.2, 428/41.7, 41.8, 42.1, 192, 194, 906, 537.5, 201; 239/34; 283/59, 105

(56) References Cited

U.S. PATENT DOCUMENTS

| | | | | |
|---|---|---|---|---|
| 3,570,139 A | * | 3/1971 | Ladd | 35/8 |
| 4,484,768 A | * | 11/1984 | Norfleet | 428/121 |
| 5,248,537 A | * | 9/1993 | Giannavola | 428/40.1 |
| 5,419,958 A | * | 5/1995 | Charbonneau | 428/315.5 |
| 5,928,748 A | * | 7/1999 | Jones | 428/40.2 |
| 2001/0023017 A1 | * | 9/2001 | Tararuj | 428/317.1 |

FOREIGN PATENT DOCUMENTS

| | | | |
|---|---|---|---|
| DE | A-4 012 263 | | 10/1991 |
| DE | U-9 294 924 | | 7/1992 |
| EP | A-0 189 656 | | 6/1986 |
| JP | 61-258879 | * | 11/1986 |
| WO | WO-A-98/37998 | | 9/1998 |

* cited by examiner

*Primary Examiner*—Nasser Ahmad
(74) *Attorney, Agent, or Firm*—Factor & Partners

(57) ABSTRACT

A folding greeting card is proposed which has a micro-capsule layer, the micro-capsules of which contain a perfume and can be destroyed mechanically. The micro-capsule layer is firmly joined to one half of the greeting card via a binder layer and is joined to the other half of the card by a self-adhesive layer when the greeting card is closed. When the card is opened the micro-capsules are destroyed and the perfume they contain is released.

13 Claims, 3 Drawing Sheets

ARTICLE COMPRISING BOARD, PAPER OR THE LIKE AND PROCESS AND INTERMEDIATE PRODUCT FOR THE PRODUCTION THEREOF

FIELD OF THE INVENTION

The invention relates to an article comprising board, paper or the like, particularly a greeting card, with two material portions which may be superimposed, and a process and an intermediate product for the production thereof

DISCUSSION OF RELATED ART

Greeting cards with different attributes are widely used, also including cards which are complex from the point of view of the printing or other attributes. Examples of such more complex greeting cards are those which contain a music chip which is activated by opening the folded card.

SUMMARY OF THE INVENTION

By means of the present invention an article comprising board, paper or the like, particularly a greeting card, is intended to be developed in such a way that a sensory stimulus (release of perfume) is obtained when it is folded open.

According to the invention this object is achieved by an article comprising board, paper or the like, particularly a greeting card, with two material portions which may be superimposed, wherein at least one of the material portions has an adhesive layer comprising a self-adhesive material and at least one of the material portions a perfume layer.

In that this article comprising board, paper or the like has a self-adhesive adhesive layer the card is securely held in the folded state. In this way the perfume layer is securely covered and no or only little perfume is released from the perfume layer until the recipient of the article comprising board, paper or the like folds it open. In the case of stiff articles this covering effect of the perfume layer is also obtained when the adhesive layer and the perfume layer are not directly superimposed when material portions are folded up.

Articles comprising board, paper or the like in the meaning of the present invention are not only greeting cards and other cards but also other printed products, packs for the most varied goods such as chocolates, soaps, cigarettes, porcelain etc. The invention may be used wherever any article of this kind has material portions which can be superimposed (folded over each other or placed over each other).

Plastics films in particular also come into consideration as material in addition to board and paper.

A development of the invention is advantageous on the one hand because where material portions are superimposed the adhesive layer covers at least a part of the perfume layer, preferably covers the entire perfume layer. This thus provides a good seal of the perfume layer obtained by means of the adhesive layer and a close cohesion of the material portions which are folded over each other precisely in the region in which the perfume layer is provided.

A development of the invention is of advantage in respect of ease of handling and simple production of the article comprising board, paper or the like. Surface regions of the article also have little modification so that it may, furthermore, be used in conventional manner, e.g. in the case of a greeting card it may be inscribed.

A development of the invention is also of advantage in respect of simple production of the article at low manufacturing cost, as only one layer needs to be applied, whether in the form of an intermediate product or by direct printing.

A development of the invention is of advantage in respect of low losses of perfumes during a storage period of the article comprising board, paper or the like which precedes actual use.

A development of the invention is also of advantage in respect of a simple producibility of the perfume layer but also in respect of the fact that the micro-capsules, if desired, can also easily be mechanically destroyed by hand in order to test the perfume released.

The micro-capsules containing a perfume can be contained in a composite structure in which they provide a pre-determined breaking surface when the other two layers are pulled apart.

A development of the invention is of advantage in respect of a simple application of the micro-capsule layer to the article.

An article can be produced particularly inexpensively. With such an article also it is ensured that perfume is released when the material portions are moved apart.

A development of the invention ensures that the two material portions which can be superimposed can be sold unjoined and yet a perfume release is prevented before a desired point in time. If a protective layer is also provided for the adhesive layer, the material portions which can be superimposed also remain unjoined initially, which facilitates inscribing a greeting card for example.

A production process for an article according to the invention is distinguished in that the perfume layer may be applied to the particular desired portion of the article accurately and at low cost.

The same advantage is obtained with respect to the adhesive layer, with a further production process.

If articles according to the invention are to be produced in small quantities only, this may take place in simple manner by using an intermediate product. This intermediate product is produced separately in larger quantities and may then be applied to the articles which are required in smaller quantities only.

Application of this kind is particularly simple in the case of a development of the intermediate product.

An intermediate product comprises a covering of the free surface, so that losses of perfumes before the article is used are avoided.

A development of the invention permits a simple application of the intermediate product to an article in particularly small quantities or also by an end consumer who can thus additionally prepare a common commercial greeting card, for example, in such a way that it releases a perfume when it is opened.

A development of the intermediate product facilitates handling by an end user. A development of the invention makes it possible to use the intermediate product like a transparent packing strip. Particularly when packing gifts, the giftwrap used thus remains fully visible, so that the bonding point is not noticeable.

An intermediate product is also already transparent when it is joined to an article while not yet activated, i.e. carries a further protective layer. This is desirable for articles produced in small quantities using intermediate products.

BRIEF DESCRIPTION OF THE DRAWINGS

The invention will be explained in greater detail below with the aid of exemplary embodiments with reference to the accompanying drawings in which.

DETAILED DESCRIPTION OF THE PREFERRED EMBODIMENTS

Figure 1:
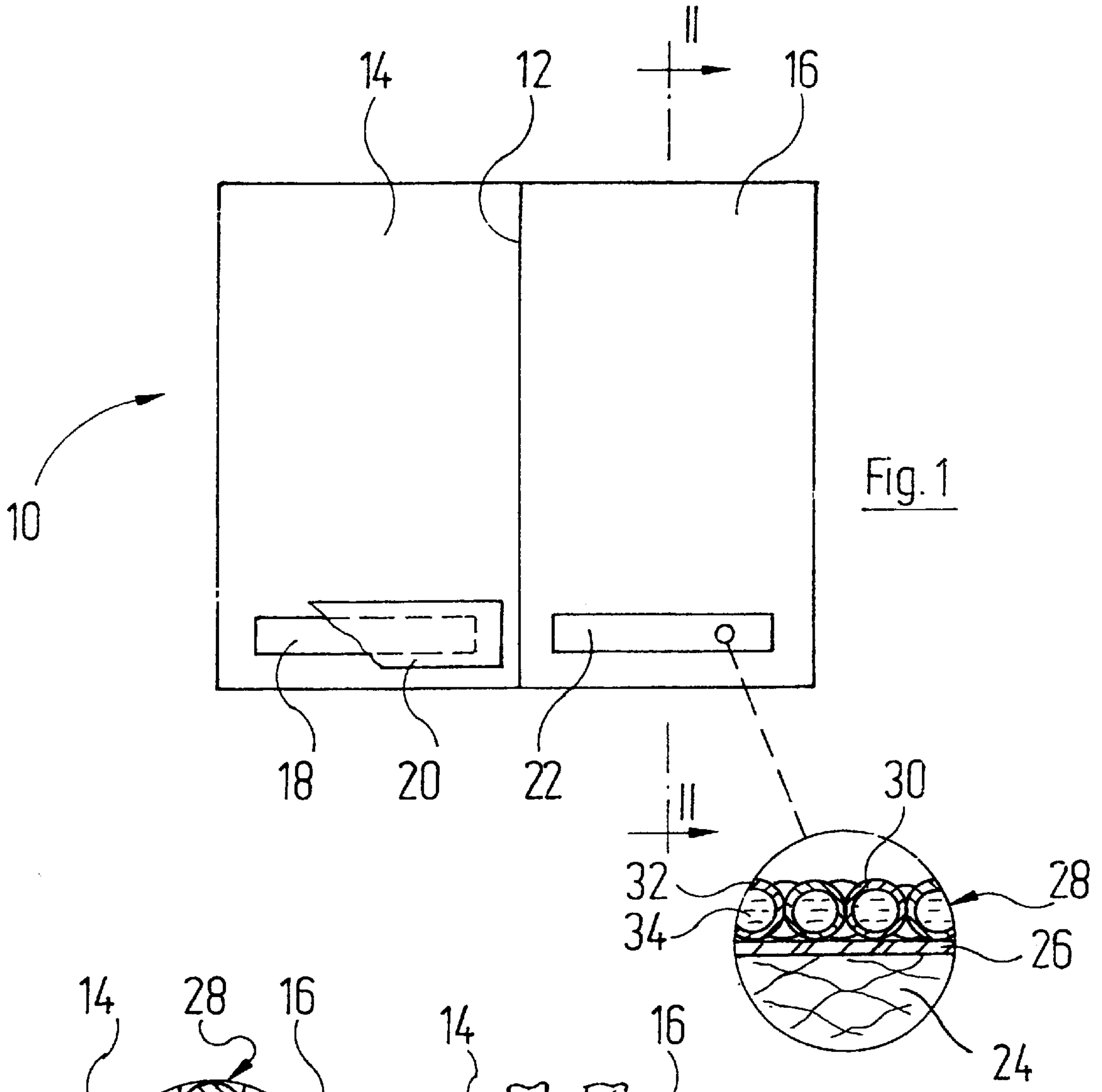
FIG. 1 shows a plan view of an opened double greeting card with perfume release.
Figure 2:
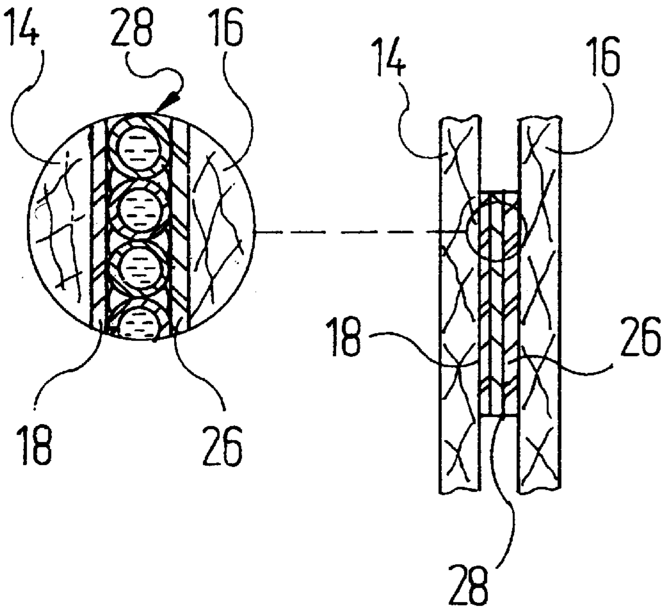
FIG. 2 shows a vertical cross-section through the one card of the double greeting card shown in FIG. 1 on an enlarged scale and along II—II of FIG. 1.

A double card produced from light board, which has card parts 14, 16 joined by means of a fold line 12, is denoted in its entirety by 10 in FIG. 1.

On the inside and at the lower end the card part 14 has a self-adhesive layer 18 which is covered by a protective layer 20 prior to use, so that the double card 10 may be folded shut and opened without hindrance.

The card part 16 has a perfume layer 22 at its lower end. The geometry and position thereof is selected in such a way that it lies flush with the self-adhesive layer 18 when the double card 10 is folded shut.

As can be seen from the enlarged detail of FIG. 1 the perfume layer 22 has the following structure:

An adhesive layer or binder layer 26 is applied to the card material 24. This may be applied by screen printing (as may the self-adhesive layer 18).

A layer 28 comprising micro-capsules 30 is atomized onto the binder layer 26 while it is still tacky, so that a substantially single-layered capsule layer is formed. The micro-capsules 30 all have a spherical capsule wall 32 which surrounds a liquid volume 34. The latter comprises a volatile solvent and a perfume distributed therein.

The material of the capsule wall 32 is not, or is only sparingly, permeable to the solvent and the perfume but can be destroyed mechanically, so that a separate protective layer is not required for the perfume layer 22.

The double card described above is sold as is conventional for such cards and remains in an envelope of corresponding size until it is used for example. Because of the protective layer 20 the card may be opened and inscribed like a normal double card. After the card has been inscribed the user pulls the protective layer 20 off and closes the card. The self-adhesive layer 18 then comes to rest on the surface of the perfume layer 22. The card is then placed in its envelope again and mailed. When the recipient opens the double card 10, the micro-capsules 30, which adhere to the binder layer 26 on the one hand and are bonded to the self-adhesive layer 18 on the other hand, are torn, so that when the double card 10 is opened the contents of the micro-capsules 30 are released and the perfume located in the liquid volume 34 can unfold.

In the embodiment according to FIGS. 3 and 4, those parts of the double card which have already been described above are provided with the same reference numerals and are not described in detail again below.

Initially the double card 10 is a normal double card which was produced in the same way as traditional cards. A perfume plaster 36 is applied to the left-hand card part 14, however. This perfume plaster comprises a perfume layer 42 which consists for its part of two self-adhesive layers 44, 46 and one micro-capsule layer 48 in between, which acts mechanically as a pre-determined breaking surface and is constructed of micro-capsules 50 which have the same structure and properties as the micro-capsules 30.

Figure 3:
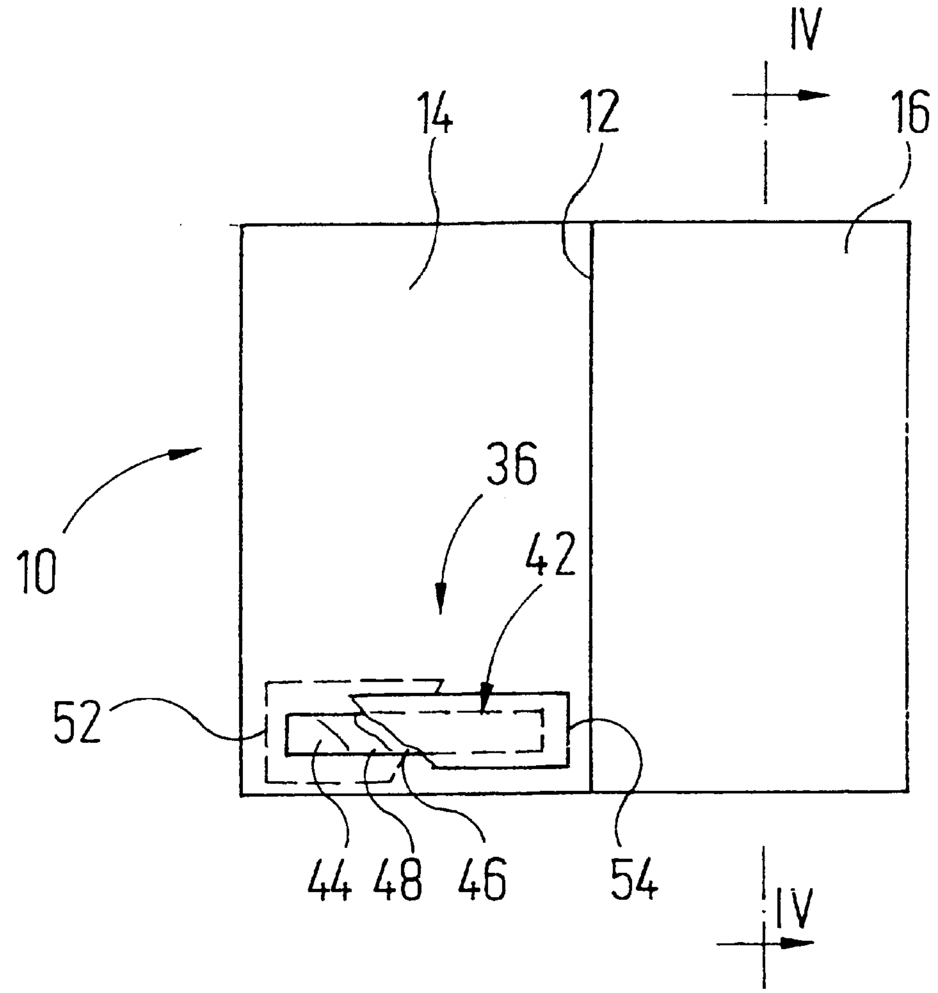
FIGS. 3 and 4 show similar views to FIGS. 1 and 2, although a modified double greeting card is shown.

A lower protective layer 52, which is shown in dashed lines only in FIG. 3 and was removed when the perfume pad 36 was bonded into the double card 10, and an upper protective layer 54 which is still to be removed by the user, further belong to the perfume pad 36

A perfume plaster of this kind may be produced, for example, by applying a first self-adhesive layer to a first (subsequently lower) protective layer strip (e.g. by knife application, spraying, atomizing and partial dissolution or melting etc.), atomizing the nicro-capsules onto this first self-adhesive layer, applying the second self-adhesive layer to a second (subsequently upper) protective layer strip (in a manner similar to that described for the first self-adhesive layer), and placing the second self-adhesive layer over the micro-capsule layer together with the second protective layer strip. The layer structure obtained in this way is then divided up by cutting into individual perfume plasters.

Figure 4:
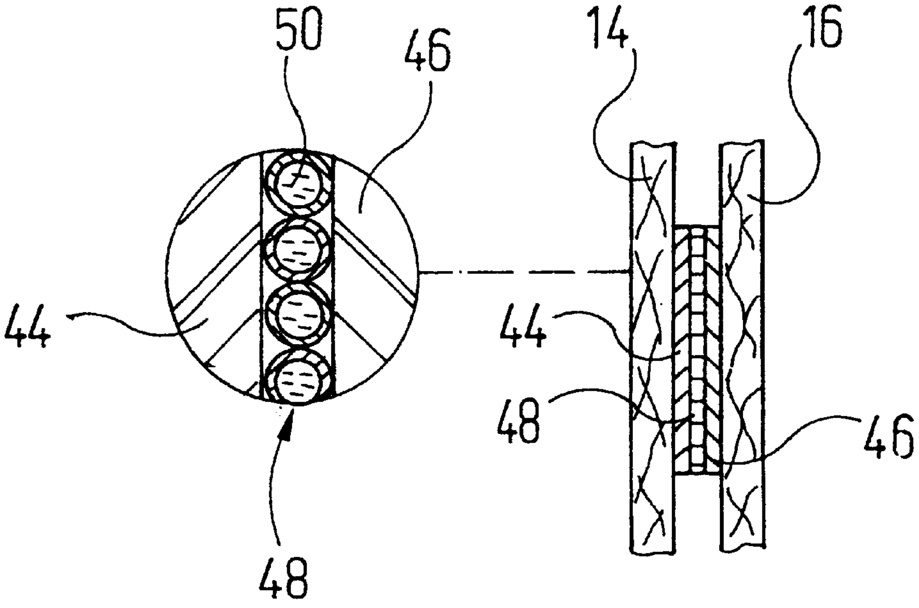

FIG. 4 shows the layer structure which is obtained when the perfume plaster 36 was bonded into the double card 10, the protective layer 52 having been removed, and after the double card had been inscribed and closed after removal of the protective layer 54. If the double card 10 is opened, the self-adhesive layers 44, 46 are separated from each other, the micro-capsule layer 48 being destroyed so that perfume is released.

Figure 5:
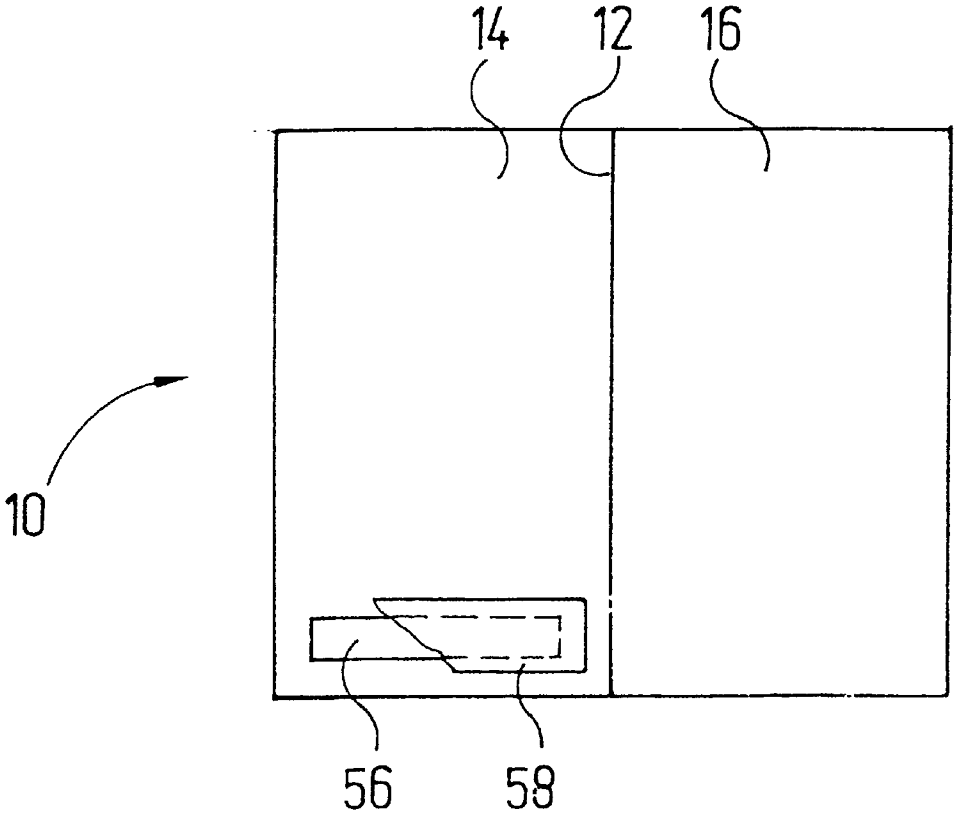
FIG. 5 shows a similar view to FIG. 1, although a further modified double greeting card is shown.

The embodiment according to FIG. 5 has a perfume layer 56 which is covered by a protective layer 58. The perfume layer 56 consists of a self-adhesive material into which a perfume was uniformly incorporated. The perfume layer 56 may again be applied by screen printing or another suitable printing process, and the protective layer 58 is then applied over the perfume layer 56 in the factory.

Alternatively, and in a manner similar to that described with reference to FIGS. 3 and 4, a perfume plaster which the user may bond into any card after removing a lower protective layer, may again be used.

Figure 6:
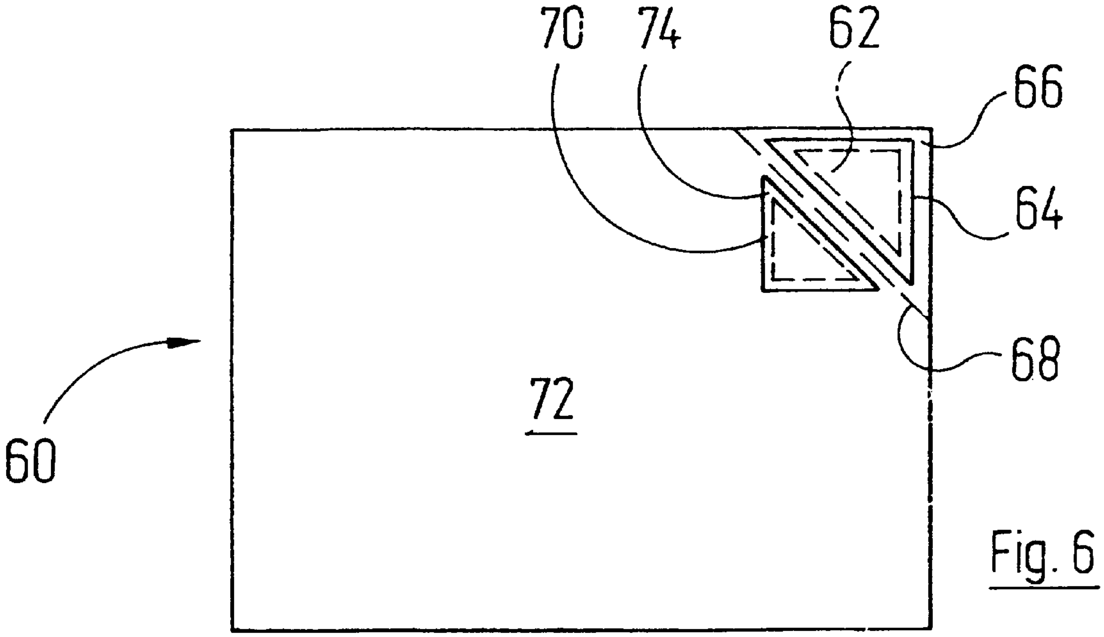
FIG. 6 shows a single greeting card with integral perfume release function.

FIG. 6 shows a single greeting card 60, to the upper right-hand comer of which a perfume layer 62 having a triangular edge contour was applied as described above (by printing or application of a perfume plaster). The perfume layer 62 is optionally covered by a protective layer 64 which the user removes after inscribing the greeting card 60. A card portion 66 carrying the perfume layer 62 may be folded over at a fold line 68 shown in dashed lines.

A self-adhesive layer 70 is located on a main portion 72 of the greeting card 60, and precisely at the point over which the perfume layer 62 comes to rest when the card portion 66 is folded at the fold line 68. It is covered by a protective layer 74 which is removed after the card has been inscribed and before the card portion 66 is folded over.

In the embodiment according to FIG. 6 the perfume layer 62 has the same structure as the perfume layer 22 shown in FIG. 1. If the sender of the greeting card has pressed the card portion 66 against the self-adhesive layer 70 after removing the protective layers 64, 74, and if the recipient of the card opens up the card portion 66 again, the micro-capsules break and thus release perfume.

It will be understood that a perfume pad may also be used instead of the perfume layer 62, as explained with reference to FIGS. 3 and 4, by way of modification of the embodiment of FIG. 6, or a perfume layer 56 which has a self-adhesive layer with perfume incorporated, as described with reference to FIG. 5.

By way of further modification the card portion 66 may also be folded over in the factory. No protective layers are then required.

The invention was explained above with reference to various greeting cards. It will be understood that it may also be used in particular in the field of packs. Packs are often folded from flat sections of material and thus necessarily have superimposed material portions which are joined by adhesive. The invention may be used at all such joining points in order to release a perfume when the joining point is opened. One need only think of envelopes, packs for foodstuffs etc.

To facilitate the production of such cards which release perfume on opening for an end user, an intermediate product which comprises plaster-like discrete sections or strips wound into a roll which are drawn off a dispenser as is conventional in the case of self-adhesive strips, may be provided for the end consumer. In the case of such an intermediate product, at least those layers which are not protective layers are preferably transparent so that the perfume plaster applied in functionally ready manner allows the backing to show through. Preferably again, one of the protective layers is also transparent so that in the case of small-scale production, and articles already provided with the perfume plaster also, the backing of the perfume plaster remains visible.

Using paper which does not separate and the embodiment according to FIG. 3, however, it would also be possible to produce books which release a certain perfume when opened at a particular page, e.g. a book about medicinal herbs which shows and describes a medicinal plant when opened at a particular page and at the same time releases a scent typical thereof, or a book about film stars which shows the photograph and career of the star when opened at a particular page and at the same time releases his favorite perfume.

In the embodiments described above the material portions which cause the perfume to be released when they are moved apart were joined via a fold line. It will be understood that these may also be independent material portions, e.g. a sealing film or a lid which cooperate with a flange portion of a container.

What is claimed is:

1. An article comprising a greeting card, with two material portions arranged on different locations of the article such that they can be superimposed by folding of the article, wherein at least one of the material portions has an adhesive layer comprising a self-adhesive material and at least one of the corresponding material portions has a perfume layer, the adhesive layer and the perfume layer overlapping when the two material portions are superimposed, and wherein a detachable protective layer is provided for at least one of the adhesive layer and the perfume layer which prevents the layer from fulfilling its function such that the article may be folded and unfolded without releasing the perfume as long as the detachable protective layer is not detached by an end user of the article.

2. An article as claimed in claim 1, wherein the perfume layer has a micro-capsule layer which contains micro-capsules which contain the perfume and can be broken open mechanically.

3. An article as claimed in claim 2, wherein at least a part of the micro-capsules lies on the surface of the perfume layer.

4. An article as claimed in claim 2, wherein at least a part of the micro-capsules forms a micro-capsule layer lying in the interior of the perfume layer.

5. An article as claimed in claim 1, wherein the micro-capsule layer is joined to one of the material portions via an adhesive layer or a binder layer at least at one of its sides.

6. A process for producing an article as claimed in claim 2, wherein adhesive and/or binder is printed onto the corresponding material portions of the article to produce the perfume layer and micro-capsules containing at least one active ingredient are atomized onto the printed adhesive and/or onto the printed binder.

7. A process for producing an article as claimed in claim 1, wherein a self-adhesive agent is printed onto the at least one material portion of the article to produce the adhesive layer.

8. An intermediate product for producing an article as claimed in claim 4, wherein it comprises a first self-adhesive layer and a second self-adhesive layer as well as a capsule layer which comprises micro-capsules which contain at least one perfume and can be mechanically destroyed, and lies between the two self-adhesive layers and the capsule layer lying between them.

9. An intermediate product as claimed in claim 8, wherein it has a protective layer for the perfume layer.

10. An intermediate product as claimed in claim 8, wherein it comprises a protective layer for the uncovered self-adhesive layer and/or the uncovered self adhesive layers.

11. An intermediate product as claimed in claim 8, wherein it is present as plaster section or as roll material.

12. An intermediate product as claimed in claim 8, wherein its adhesive layers and its perfume layer are transparent.

13. An intermediate product as claimed in claim 12, wherein at least one of its protective layers is transparent.

* * * * *